United States Patent
Ho et al.

(10) Patent No.: US 9,760,650 B2
(45) Date of Patent: Sep. 12, 2017

(54) AUTOMATIC NOTIFICATION

(75) Inventors: Michelle Ho, Taipei (TW); Jungle Chu, Taipei (TW)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 249 days.

(21) Appl. No.: 13/394,915

(22) PCT Filed: Aug. 13, 2010

(86) PCT No.: PCT/IB2010/053670
§ 371 (c)(1),
(2), (4) Date: Mar. 8, 2012

(87) PCT Pub. No.: WO2012/020282
PCT Pub. Date: Feb. 16, 2012

(65) Prior Publication Data
US 2012/0173994 A1 Jul. 5, 2012

(51) Int. Cl.
*G06F 17/30* (2006.01)

(52) U.S. Cl.
CPC .. *G06F 17/30905* (2013.01); *G06F 17/30867* (2013.01)

(58) Field of Classification Search
CPC .... G06Q 10/107; G06Q 10/10; G06Q 10/109; H04L 12/581; G06F 3/048–3/04897; G06F 17/30861–17/30905; Y10S 706/931
USPC ........................................................ 715/752
See application file for complete search history.

(56) References Cited

U.S. PATENT DOCUMENTS 5,969,708 A * 10/1999 Walls ............................ 715/857
8,108,271 B1 * 1/2012 Duncan et al. ................. 705/28

2002/0130899 A1 * 9/2002 Ryan ...................... G06Q 30/06
715/738
2003/0214536 A1 * 11/2003 Jarrett .................... G06K 9/222
715/831

(Continued)

FOREIGN PATENT DOCUMENTS

CN   101299688 A   11/2008
CN   101504747 A   8/2009

(Continued)

OTHER PUBLICATIONS

Cussen, "How to Receive Stock Price Alerts", Oct. 11, 2008, http://web.archive.org/web/20081011061825/http://www.ehow.com/how_2075740_receive-stock-price-alerts.html, pp. 1-2.*
Abbyy OCR for iPhone Applications, Jul. 22, 2009, http://web.archive.org/web/20090722182507/http://www.labnol.org/software/abbyy-ocr-sdk-for-iphone/8050, p. 1.*
Screen Scraping, https://web.archive.org/web/20081218171316/http://en.wikipedia.org/wiki/Screen_scraping, Dec. 18, 2008, pp. 1-3.*
Kumar, Ajit. Alertbox. Distill Web Monitor. Vers. 0.2.3.20100517. Mozilla Foundation, May 17, 2010. Web. Aug. 17, 2015. <https://addons.mozilla.org/en-US/firefox/addon/alertbox/versions/>.*

(Continued)

*Primary Examiner* — Jennifer To
*Assistant Examiner* — Liang Li
(74) *Attorney, Agent, or Firm* — Tucker Ellis, LLP

(57) ABSTRACT

A method may include displaying a document including a first item, receiving a first user input selecting the first item and receiving a second user input providing a target value associated with the first item. The method may also include accessing a site associated with the document, monitoring a value associated with the first item and determining whether the value associated with the first item meets the target value. The method may further include generating a notification when the value associated with the first item meets the target value.

20 Claims, 13 Drawing Sheets

(56) References Cited

U.S. PATENT DOCUMENTS

| | | | |
|---|---|---|---|
| 2004/0049785 A1* | 3/2004 | Grzeczkowski | ... H04N 7/17327 725/46 |
| 2005/0213717 A1 | 9/2005 | O'Neil | |
| 2006/0267783 A1* | 11/2006 | Smith | .................. G01W 1/00 340/601 |
| 2008/0122796 A1* | 5/2008 | Jobs et al. | .................. 345/173 |
| 2011/0197150 A1* | 8/2011 | Huang | ............... G06F 17/3089 715/760 |

FOREIGN PATENT DOCUMENTS

| | | |
|---|---|---|
| WO | 01/11503 A2 | 2/2001 |
| WO | 0111503 | 2/2001 |
| WO | 0111503 A2 | 2/2001 |

OTHER PUBLICATIONS

Bryhall2. "Tesseract (Screen OCR) UDF." Forum Posting. Autoit Forums. Autoit, May 28, 2010. Web. Nov. 28, 2015. <https://www.autoitscript.com/forum/topic/89542-tesseract-screen-ocr-udf/?page=1>.*

International Search Report and Written Opinion dated Nov. 2, 2010 issued in corresponding PCT application No. PCT/IB2010/053670, 10 pages.

International Preliminary Report on Patentability dated Feb. 28, 2013 issued in corresponding PCT application No. PCT/IB2010/053670, 5 pages.

* cited by examiner

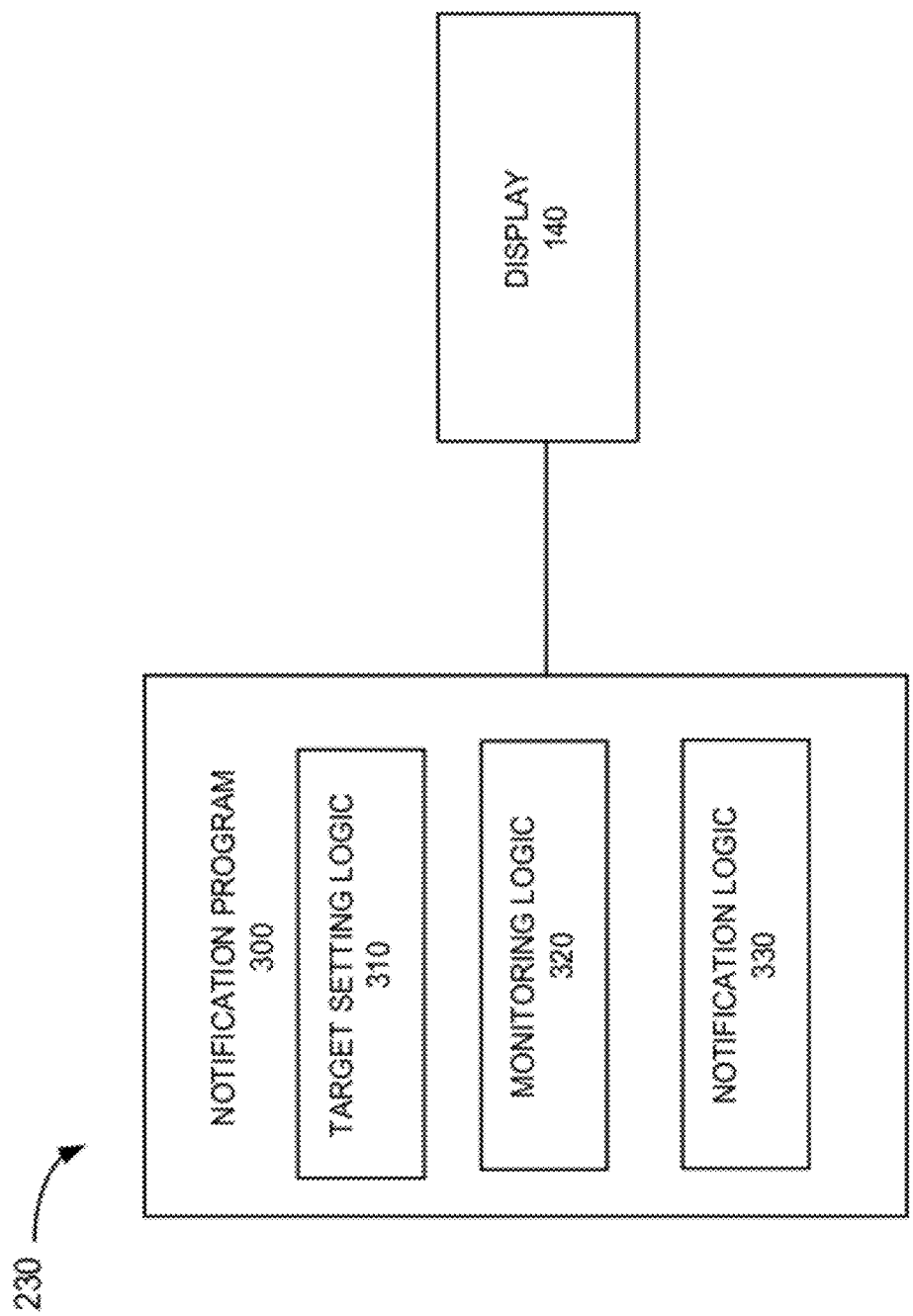

AUTOMATIC NOTIFICATION

TECHNICAL FIELD OF THE INVENTION

The invention relates generally to providing notifications and, more particularly, to automatically providing notifications based on user-defined parameters.

DESCRIPTION OF RELATED ART

Computer, communication and entertainment devices, such as personal computers (PCs), lap top computers, mobile terminals, personal digital assistants (PDAs), etc., are often used to view information of interest. For example, a user may access the Internet via a mobile terminal to view web pages. The user may return to a particular web page of interest multiple times over a period of time, such as during the course of a day, to receive updated information of interest.

SUMMARY

According to one aspect, a device is provided. The device includes a display configured to display a web page including a first item. The device also includes logic configured to receive a first user input selecting the first item, receive a second user input providing a target value associated with the first item and access a website associated with the web page. The logic is also configured to monitor the first item, determine whether a value associated with the first item meets the target value, and generate a notification to the user or signal the device to provide a notification to the user when the value associated with the first item meets the target value.

Additionally, the logic may be further configured to identify a location on the web page associated with the first item, and when monitoring the first item, the logic may be configured to determine, based on the identified location, a value associated with the first item displayed on the web page.

Additionally, when determining a value, the logic may be configured to identify the value using optical character recognition.

Additionally, when generating a notification or signaling the device to provide a notification, the logic may be configured to provide a visual indication on the display that the first item meets the target value.

Additionally, the device may further comprise a speaker, and when generating a notification or signaling the user device to provide a notification, the logic may be configured to at least one of generate a text message, generate a short message service message, generate an electronic mail message, signal the speaker to output an audible alert, or output a web page to the display.

Additionally, when generating a notification or signaling the user device to provide a notification, the logic may be configured to output a web page to the display, wherein the first item is highlighted via at least one of a different color, larger font or different font than other items on the web page.

Additionally, when receiving a first user input, the logic may be configured to recognize a particular motion or shape associated with the first user input.

Additionally, the particular motion or shape may comprise a box, a circle or another shape surrounding the first item.

Additionally, the logic may be further configured to allow the user to at least one of select an item on the web page or select an area on the web page.

Additionally, the logic may be further configured to provide a graphical user interface (GUI) to allow the user to input at least one target value associated with the selected item or selected area.

Additionally, the at least one target value may comprise a plurality of target values, and the logic may be further configured to generate a first notification in response to the value associated with the first item meeting a first one of the plurality of target values, and generate a second notification in response to the value associated with the first item meeting a second one of the plurality of target values.

Additionally, the logic may be further configured to receive input from the user identifying a type of notification to be provided when the value associated with the first item meets the target value.

Additionally, the device may comprise a mobile terminal.

According to another aspect, a method is provided. The method includes displaying a document including a first item, receiving a first user input selecting the first item and receiving a second user input providing a target value associated with the first item. The method also includes accessing a site associated with the document, monitoring a value associated with the first item, determining whether the value associated with the first item meets the target value and generating a notification when the value associated with the first item meets the target value.

Additionally, the method may include identifying a location on the document associated with the first item, and monitoring a value associated with the first item may comprise determining, based on the identified location, the value associated with the first item displayed on the document.

Additionally, the method may further comprise receiving input from the user identifying a type of notification to be provided when the value associated with the first item meets the target value.

Additionally, the method may further comprise providing a graphical user interface (GUI) to allow the user to input the target value.

According to a further aspect, a computer-readable memory device having stored thereon sequences of instructions is provided. The instructions, when executed by at least one processor, cause the at least one processor to output, to a display, a document, receive input selecting a first item displayed in the document and receive a target value associated with the first item. The instructions also cause the at least one processor to access the document, monitor a current value associated with the first item, determine whether the current value associated with the first item meets the target value, and generate a notification when the current value associated with the first item meets the target value.

Additionally, the instructions for receiving input and receiving a target value may cause the at least one processor to receive the input and receive the target value via the display.

Additionally, the instructions for generating a notification may cause the at least one processor to generate at least one of a visual notification via the display or signal an output device to output an audible alarm.

BRIEF DESCRIPTION OF THE DRAWINGS

Reference is made to the attached drawings, wherein elements having the same reference number designation may represent like elements throughout.

FIG. 3 is a block diagram of components implemented in the device of FIG. 2 according to an exemplary implementation;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

EXEMPLARY SYSTEM

Figure 1:
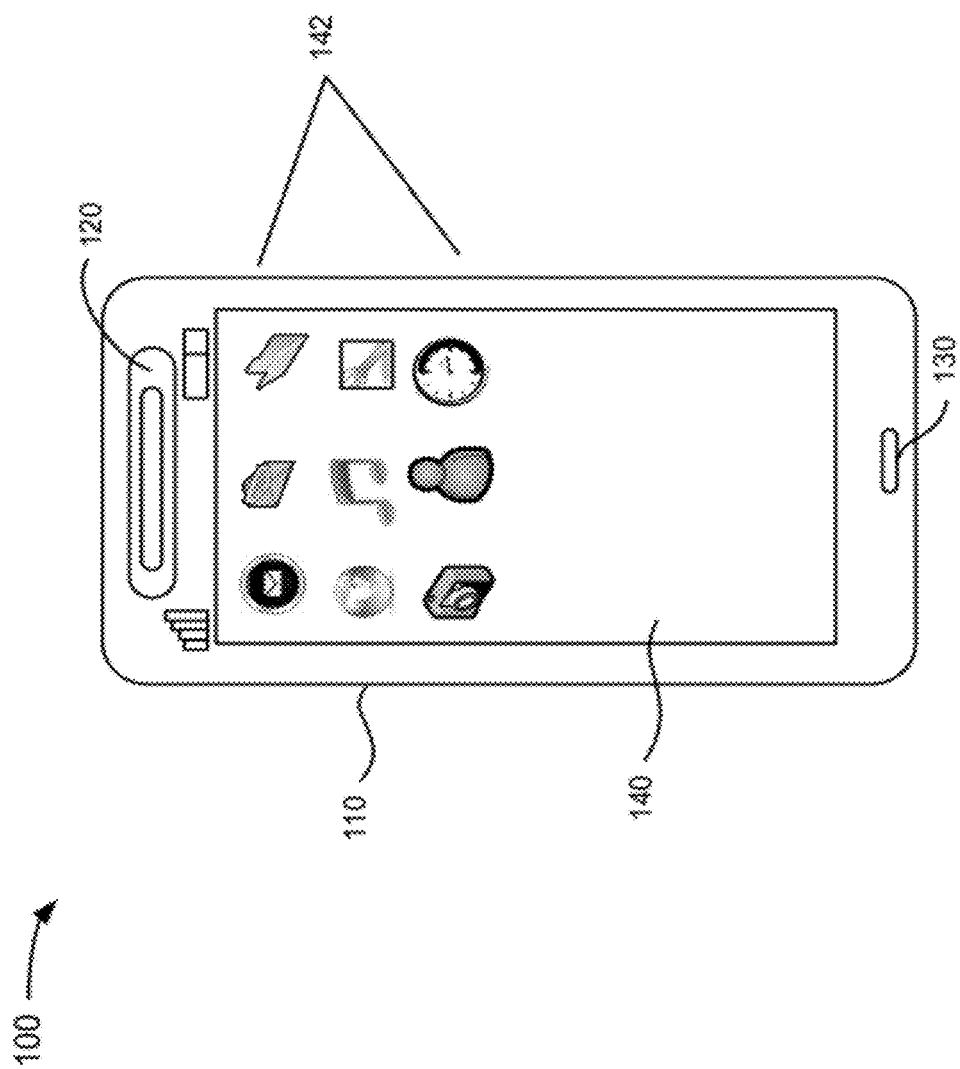
FIG. 1 is a diagram of an exemplary device in which methods and systems described herein may be implemented.

FIG. 1 is a diagram of an exemplary user device 100 in which methods and systems described herein may be implemented. In an exemplary implementation, user device 100 may be a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. It should also be understood that systems and methods described herein may also be implemented in other devices that display information of interest and allow users to interact with the displayed information. For example, user device 100 may include a personal computer (PC), a laptop computer, a personal digital assistant (PDA), a media playing device (e.g., an MPEG audio layer 3 (MP3) player, a video game playing device, etc.), a global positioning system (GPS) device, etc.

Referring to FIG. 1, user device 100 may include a housing 110, a speaker 120, a microphone 130 and a display 140. Housing 110 may protect the components of user device 100 from outside elements. Speaker 120 may provide audible information to a user of user device 100. Microphone 130 may receive audible information from the user for activating applications or routines stored within user device 100.

Display 140 may provide visual information to the user. For example, display 140 may provide information regarding incoming or outgoing telephone calls, electronic mail (e-mail), instant messages, short message service (SMS) messages, etc. Display 140 may also display information, such as icons 142, regarding various applications stored in user device 100, such as an email program, a camera program/function, a phone book/contact list, an Internet browser used to access/download content (e.g., news or other information), etc. In an exemplary implementation, display 140 may be a touch screen display device that allows a user to enter commands and/or information via a finger, a stylus, a mouse, a pointing device, or some other device. For example, display 140 may be a resistive touch screen, a capacitive touch screen, an optical touch screen, an infrared touch screen, a surface acoustic wave touch screen, or any other type of touch screen device that registers an input based on a contact with the screen.

Display 140 may also provide control buttons and/or a keypad, such as a soft telephone keypad (not shown), that permit the user to interact with user device 100 to cause user device 100 to perform one or more operations, such as place a telephone call, access information, etc. In an exemplary implementation, the control buttons may include one or more buttons that controls various applications associated with display 140. For example, one or more of the control buttons may be used to initiate execution of an application program that permits a user to select an item, such as a data item, on display 140 and provide target values associated with monitoring the data item, as described in detail below.

Figure 2:
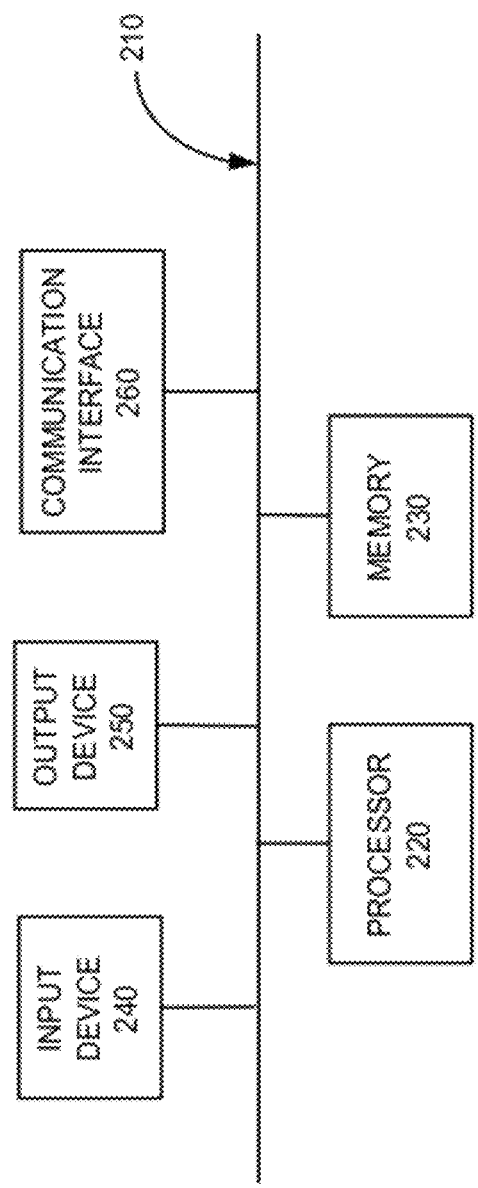
FIG. 2 is a functional block diagram of exemplary components implemented in the device of FIG. 1.

FIG. 2 is a diagram illustrating components of user device 100 according to an exemplary implementation. User device 100 may include bus 210, processor 220, memory 230, input device 240, output device 250 and communication interface 260. Bus 210 permits communication among the components of user device 100. One skilled in the art would recognize that user device 100 may be configured in a number of other ways and may include other or different elements. For example, user device 100 may include one or more modulators, demodulators, encoders, decoders, etc., for processing data.

Processor 220 may include a processor, microprocessor, an application specific integrated circuit (ASIC), field programmable gate array (FPGA) or other processing logic. Processor 220 may execute software instructions/programs or data structures to control operation of user device 100.

Memory 230 may include a random access memory (RAM) or another type of dynamic storage device that stores information and instructions for execution by processor 220; a read only memory (ROM) or another type of static storage device that stores static information and instructions for use by processor 220; a flash memory (e.g., an electrically erasable programmable read only memory (EEPROM)) device for storing information and instructions; a hard disk drive (HDD); and/or some other type of magnetic or optical recording medium and its corresponding drive. Memory 230 may also be used to store temporary variables or other intermediate information during execution of instructions by processor 220. Instructions used by processor 220 may also, or alternatively, be stored in another type of computer-readable medium accessible by processor 220. A computer-readable medium may include one or more memory devices.

Input device 240 may include mechanisms that permit an operator to input information to user device 100, such as microphone 130, a keypad, control buttons, a keyboard (e.g., a QWERTY keyboard, a Dvorak keyboard, etc.), a gesture-based device, an optical character recognition (OCR) based device, a joystick, a touch-based device, a virtual keyboard, a speech-to-text engine, a mouse, a pen, a stylus, voice recognition and/or biometric mechanisms, etc. In an exemplary implementation, display 140 may be a touch screen display that acts as an input device.

Output device 250 may include one or more mechanisms that output information to the user, including a display, such as display 140, a printer, one or more speakers, such as speaker 120, etc. As described above, in an exemplary implementation, display 140 may be a touch screen display. In such an implementation, display 140 may function as both an input device and an output device.

Communication interface 260 may include a transceiver that enables user device 100 to communicate with other devices and/or systems. For example, communication interface 260 may include a modem or an Ethernet interface to a LAN. Communication interface 260 may also include mechanisms for communicating via a network, such as a wireless network. For example, communication interface 260 may include one or more radio frequency (RF) transmitters, receivers and/or transceivers and one or more antennas for transmitting and receiving RF data via a network.

User device 100 may provide a platform for a user to send and receive communications (e.g., telephone calls, electronic mail, text messages, multi-media messages, short message service (SMS) messages, etc.), play music, search the Internet, or perform various other functions. User device 100, as described in detail below, may also perform processing associated with setting target values associated with information of interest to the user. User device 100 may then monitor the information of interest and automatically notify the user when the target value is reached. User device 100 may perform these operations in response to processor 220 executing sequences of instructions contained in a computer-readable medium, such as memory 230. Such instructions may be read into memory 230 from another computer-readable medium via, for example, communication interface 260. In alternative embodiments, hard-wired circuitry may be used in place of or in combination with software instructions to implement processes consistent with the invention. Thus, implementations described herein are not limited to any specific combination of hardware circuitry and software.

FIG. 3 is an exemplary block diagram of components implemented in user device 100 of FIG. 2. In an exemplary implementation, all or some of the components illustrated in FIG. 3 may be stored in memory 230. For example, referring to FIG. 3, memory 230 may include notification program 300.

Notification program 300 may include a software program executed by processor 220 that allows a user to set various parameters associated with information provided on display 140, such as targets associated with various items displayed within a document. The term "document," as used herein, is to be broadly interpreted to include any machine-readable and machine-storable work product. For example, a document may include a web page, information relating to a news event, an image file, information relating to a merchant's product, information relating to a usenet page, a scanned book, a file, a combination of files, one or more files with embedded links to other files, a blog, a web advertisement, an e-mail, etc. Documents may include textual information and embedded information (such as meta information, hyperlinks, etc.) and/or embedded instructions (such as Javascript, etc.).

Figure 4A:
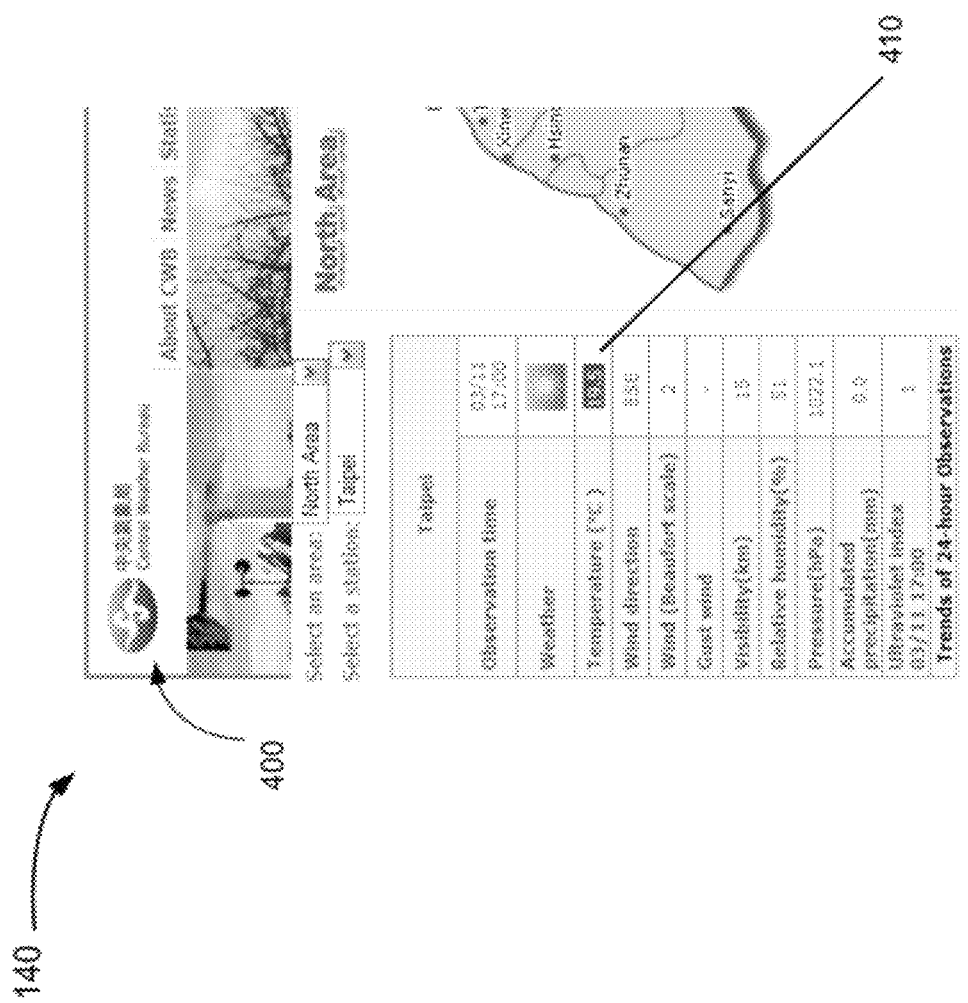
FIGS. 4A and 4B are exemplary documents that may be viewed via the device of FIG. 1.

Referring to FIG. 3, notification program 300 may include target setting logic 310, monitoring logic 320 and notification logic 330. Target setting logic 310 may include logic to allow a user to select a particular portion of a document provided on display 140. For example, FIG. 4A illustrates a web page 400 associated with the Central Weather Bureau (CWB) of Taiwan's website. As illustrated, web page 400 includes a number of weather-related parameters, such as temperature, wind direction, wind speed, visibility, relative humidity, etc. In this case, the user may be particularly interested in the temperature, which is displayed as being 19.5° Celsius. (C).

The user may further wish to set a parameter/target associated with monitoring the temperature. In this case, target setting logic 310 may allow the user to graphically select the temperature value of 19.5° C. on display 140, illustrated as being highlighted or surrounded by a box at area 410 in FIG. 4A. Target setting logic 310 may also provide a graphical user interface (GUI) that allows the user to input a target value associated with the temperature. As an example, the user may set a target value for temperature of 30° C., as described in more detail below.

Figure 4B:
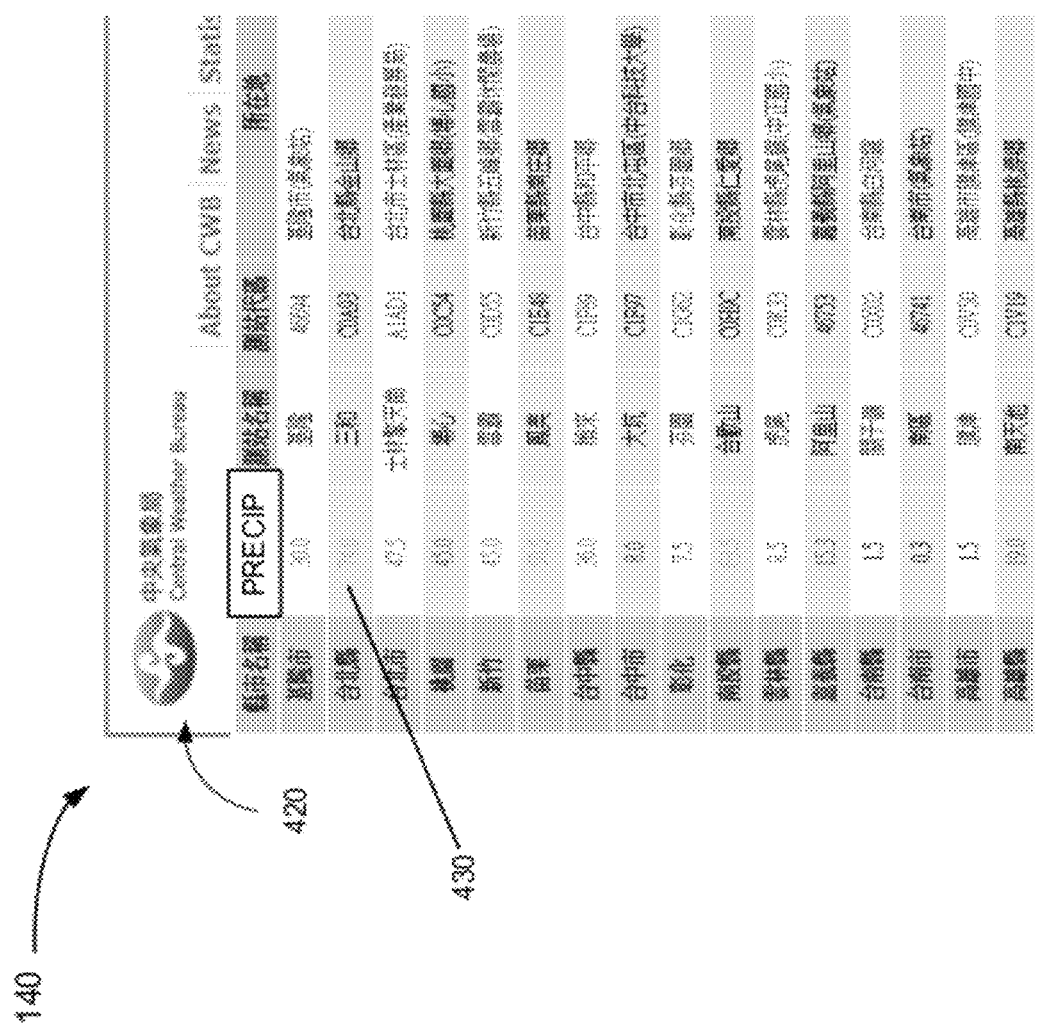

As another example, the user may view web page 420 illustrated in FIG. 4B, which is from the same website as the web page illustrated in FIG. 4A. In this case, target setting logic 310 may allow the user to select another parameter, such as precipitation, indicated at area 430. Target setting logic 310 may allow the user to input one or more parameters via the GUI that will be associated with a target precipitation value. As an example, the user may view the current value of 74 millimeters (mm) of precipitation at area 430 in FIG. 4B and wish to set a target value of 100 mm of precipitation, as described in more detail below.

Monitoring logic 320 may include logic that monitors the target parameters selected by the user. For example, continuing with the example above, monitoring logic 320 may monitor the temperature and precipitation in Taipei by accessing the CWB website. In an exemplary implementation, monitoring logic 320 may perform this function as a background process while user device 100 is turned on. For example, monitoring logic 320 may periodically (e.g., every 5 minutes, every hour, every two hours, etc.) visit the appropriate web pages of the CWB website and monitor the temperature and precipitation. In one implementation, monitoring logic 320 may access the web pages on which the target parameters were set and perform optical character recognition or some other type of image recognition on the currently displayed values to determine whether the user-input parameters meet the target values. In other implementations, monitoring logic 320 may include logic that requests information from the CWB website that corresponds to the information of interest and receive periodic updates from the CWB website, or use other techniques to monitor the information of interest. In each case, monitoring logic 320 may periodically (or continuously) monitor the information of interest to determine whether the target values are reached, as described in more detail below.

Notification logic 330 may include logic that alerts the user when an item or parameter selected by the user reaches the user-defined target value. For example, notification logic 330 may output information to display 140 to provide a visual alert to the user when a target value is reached. The visual alert may include, for example, displaying information via display 140, blinking a light on user device 100, changing a color of display 140, changing a color of a portion of user device 100, etc. Alternatively, or additionally, notification logic 330 may activate an audible alert, activate a vibration mechanism or activate some other mechanism that provides haptic feedback to alert the user of user device 100 that a target value has been reached. In still other instances, notification logic 330 may automatically download a web page of interest to user device 100, send a text-based alert (e.g., a text message, a short message service (SMS) message, a page, an email, etc.) for output via user device 100 and/or provide notification via user device 100 in some other manner to alert the user that a target has been reached, as described in more detail below.

Figure 5:
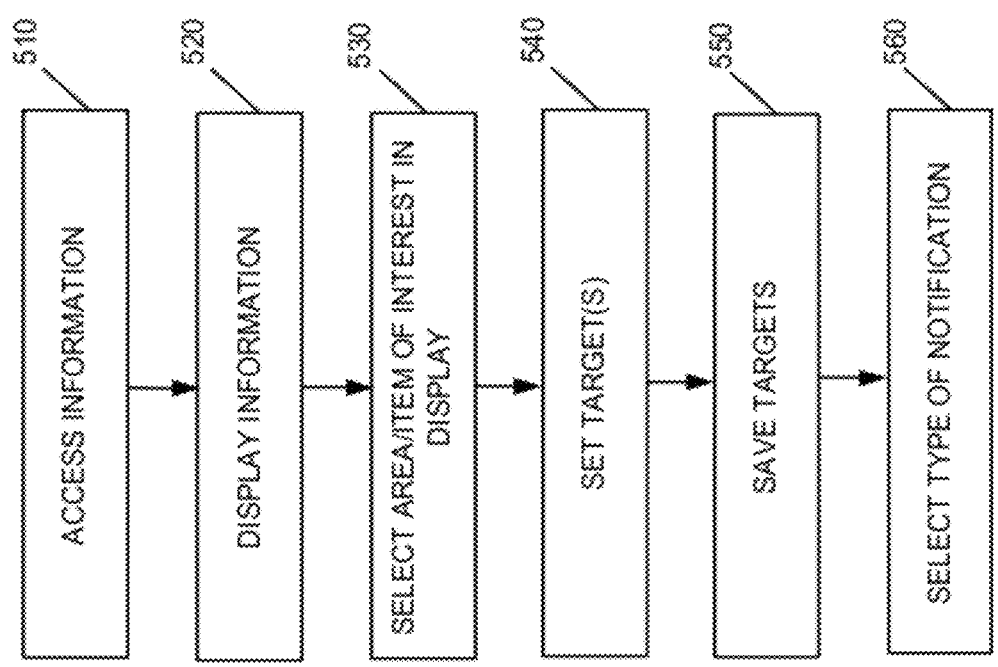
FIG. 5 is a flow diagram illustrating exemplary processing associated with setting target values for parameters displayed on the device of FIG. 1.

FIG. 5 illustrates exemplary processing associated with setting target parameters. Processing may begin with a user of user device 100 accessing information of interest (act 510). For example, a user of user device 100 may access a web site of interest and user device 100 may display a web page via display 140 (act 520). As an example, the user may access a web site associated with the Nasdaq stock exchange and user device 100 may download web page 600 (e.g., a home page) from the web site for output via display 140, as illustrated in FIG. 6A.

Figure 6A:
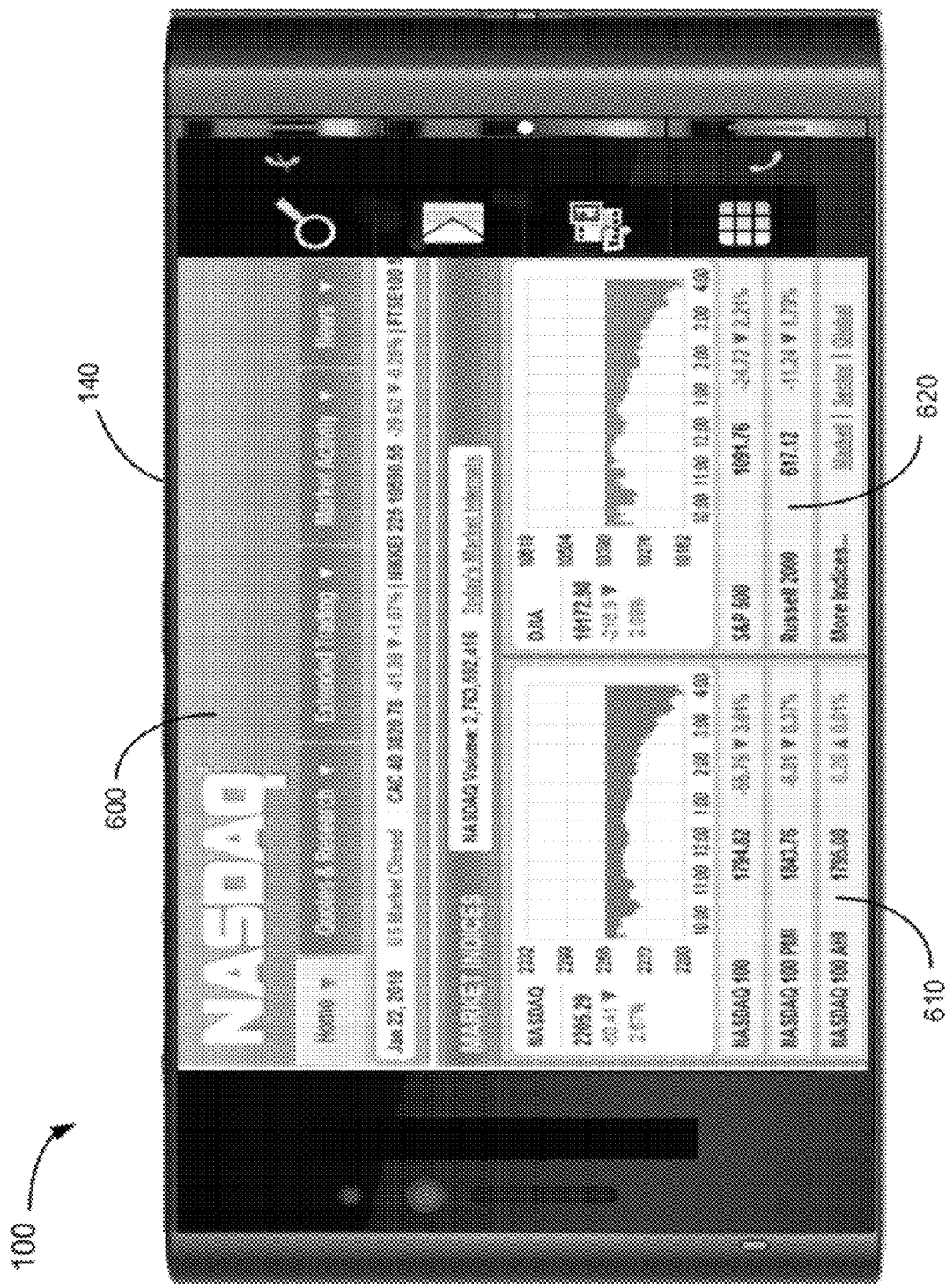
FIGS. 6A-6C are diagrams of exemplary displays associated with setting target values associated with the processing of FIG. 5.
Figure 6B:
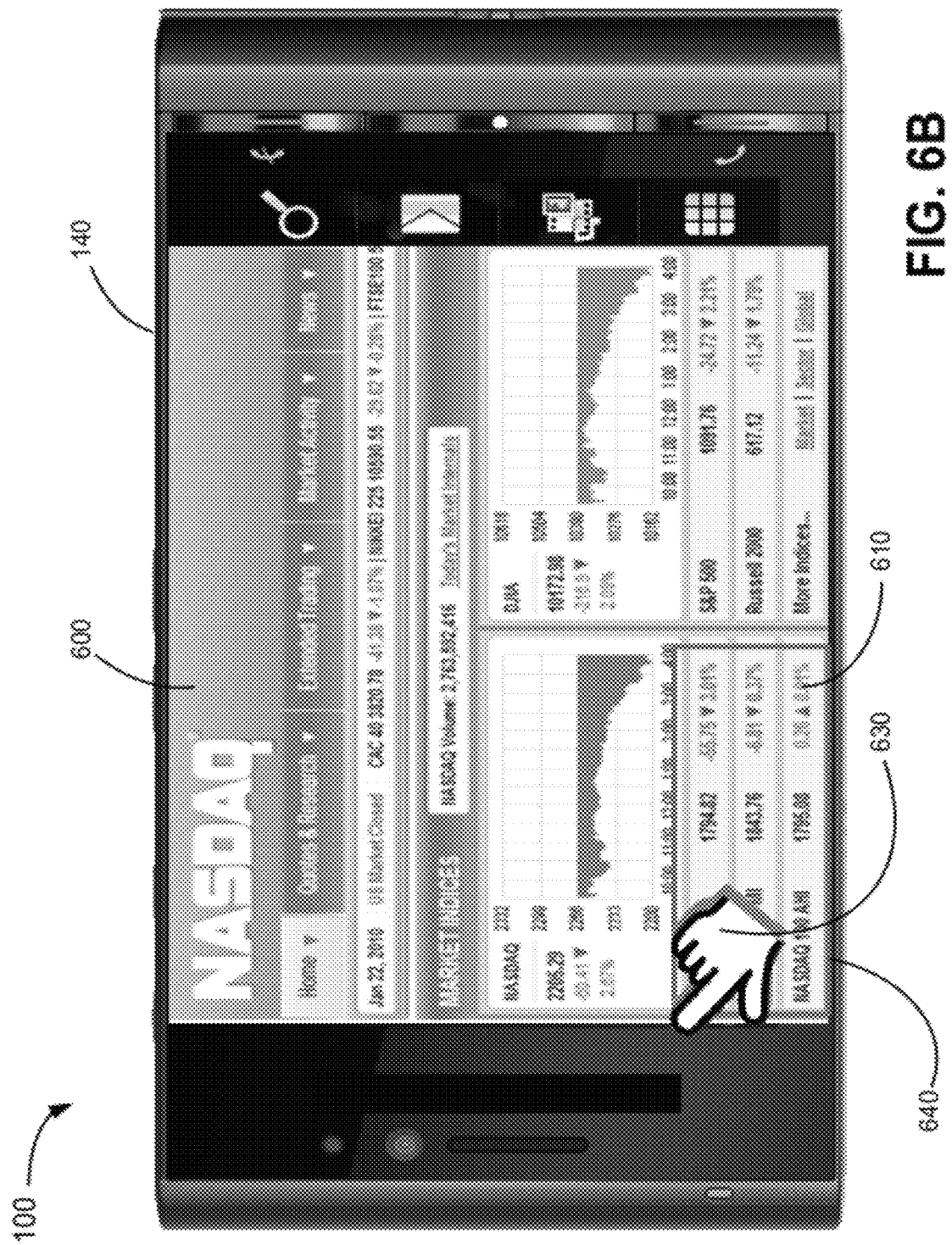

Referring to FIG. 6A, web page 600, also referred to herein as document 600, includes a number of values associated with the Nasdaq stock index at area 610, as well as values associated with other stock indices at area 620. The user may select a portion of document 600 and/or a value displayed in document 600 (act 530). For example, the user may take a mouse, pointer, stylus, his/her finger or other device, indicated by hand symbol 630 in FIG. 6B, and draw a box 640 around area 610. Alternatively, the user may enclose area 610 via a circle or some other shape. In one implementation, the user may launch notification program 300 using one or more of control buttons and/or an applications menu prior to selecting a portion of document 600. Alternatively, notification program 300 may run as a background process any time that user device 100 is turned on and allow the user to identify a portion of a document in the manner described above.

Figure 6C:
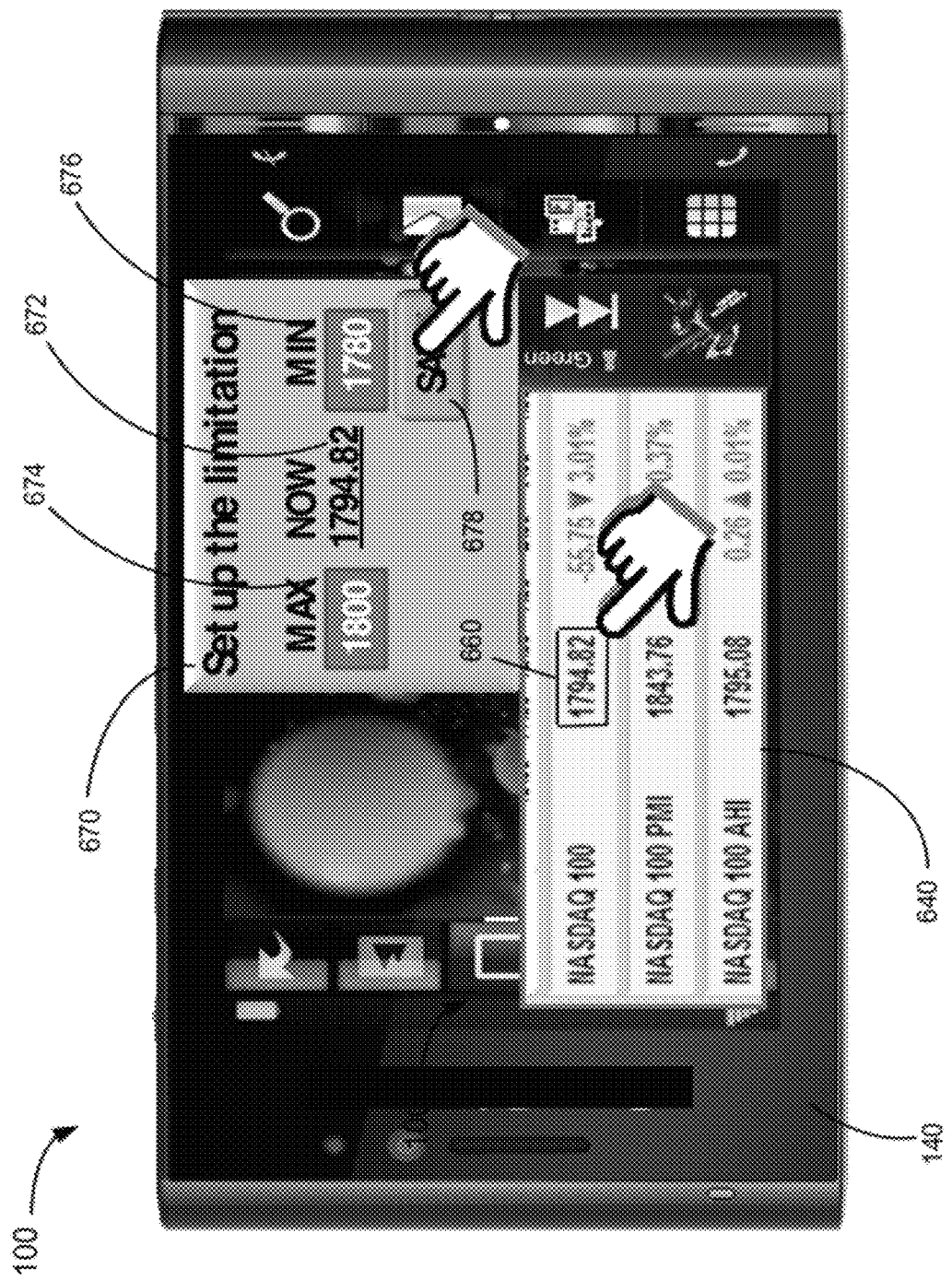

In either case, after the area of interest is selected by the user, target setting logic 310 may provide a GUI that allows a user to select a particular value or parameter within box 640 (act 530). For example, the user may select the value associated with NASDAQ 100 (i.e., 1794.82 in this example) by drawing box 660 or otherwise encircling the value 1794.82, as illustrated in FIG. 6C. In other implementations, the user may select the value by other techniques, such as clicking a mouse or pointer, tapping the value on display 140, etc. In each case, after the user has selected a particular item or parameter of interest, target setting logic 310 may allow the user to set one or more target values associated with the selected item of interest (act 540). For example, referring to FIG. 6C, target setting logic 310 may provide a graphical user interface (GUI) that includes user input box 670 in response to the user selection at box 660 (i.e., selecting the Nasdaq 100 parameter). As illustrated, input box 670 displays a current value for the Nasdaq 100 in area 672. In an exemplary implementation, the value at area 672 may be underlined, indicating that the value is available for setting target values associated with the parameter.

As further illustrated in FIG. 6C, the GUI provided by target setting logic 310 includes user input boxes 674 and 676 that correspond to maximum and minimum values, respectively, for the Nasdaq 100 index. The user may input values in boxes 674 and 676 via a keyboard, keypad or other input device (act 540).

For example, the user may use a keypad on user device 100 to input the values 1800 and 1780 into boxes 674 and 676, respectively. The user may also select Save button 678 to save these values, as indicated by the hand symbol in FIG. 6C (act 550). Target setting logic 310 may then save the values, along with the web page information (e.g., the web pages that display the item of interest), and the location of the parameter of interest with respect to the web page. Monitoring logic 320 may then monitor the current values to determine if either the maximum or minimum target value is reached, as described in detail below.

Target setting logic 310 may also allow the user to select the type of notification to be provided if the target value is reached (act 560). For example, the GUI associated with target setting logic 310 may provide a list of different types of notification via which a user may wish to be notified when a target value is reached. As discussed above, types of notifications may include a message that is displayed or "popped" on display 140, an audio alert, such as an alarm or particular ringtone, a vibratory alert, a text based alert (text message, SMS message, email, page, etc.), or a combination of alerts that will be provided to user device 100 to alert the user. In some implementations, target setting logic 310 may allow the user to identify an external device, such as another computer or communication device associated with the user, to which a notification will be sent. In each case, monitoring logic 320 may monitor the user defined parameters and alert the user when the target value is reached (or exceeded), as described in detail below.

Figure 7:
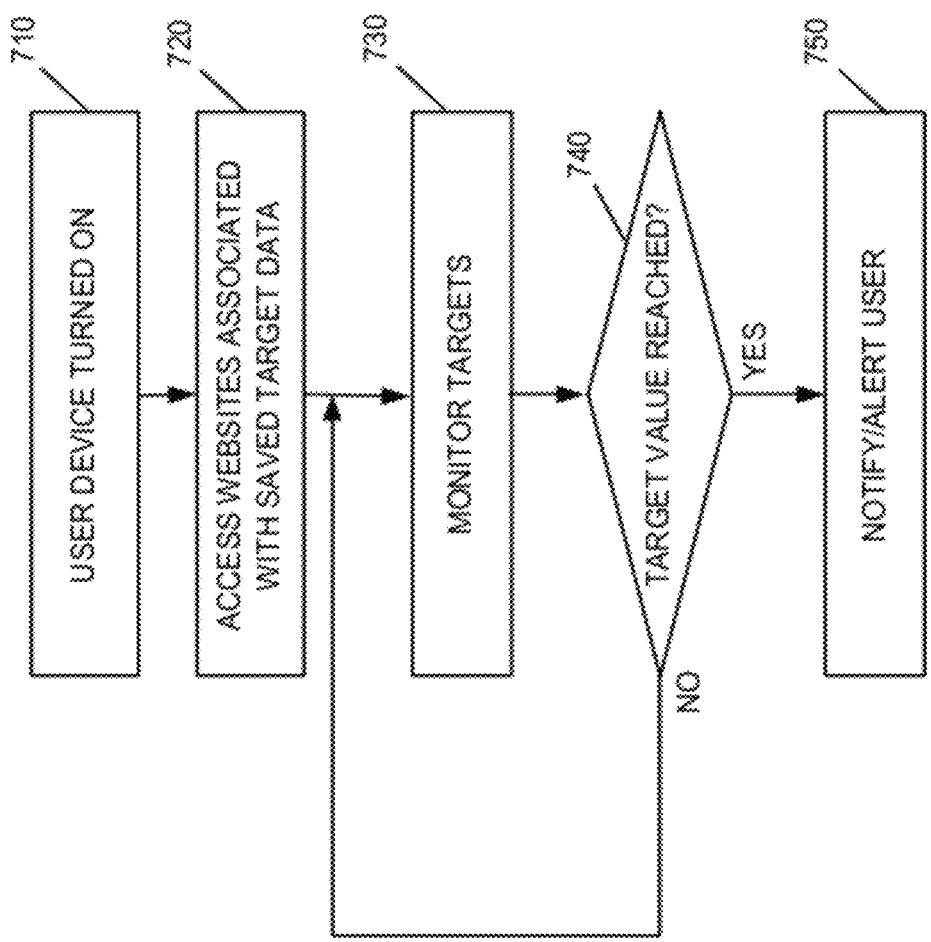
FIG. 7 is a flow diagram illustrating exemplary processing associated with monitoring user-defined parameters via the user device of FIG. 1.

FIG. 7 is a flow diagram illustrating exemplary processing associated with notification program 300. Processing may begin with a user turning on user device 100 (act 710). As described above, when user device 100 is turned on, notification program 300 may run as a background process that actively performs monitoring of target parameters set by the user. In some implementations, user device 100 may automatically turn on at periodic intervals to execute the monitoring described below.

Continuing with the example above in which the user has set maximum and minimum target values for the Nasdaq 100 index, monitoring logic 320 may access the website associated with the web pages on which the user set the target values (act 720). Monitoring logic 320 may then monitor the current value of the Nasdaq 100 stock index based on the user defined target values (act 730).

For example, as described above, target setting logic 310 may have previously saved the location or area on the web page in which the item of interest is displayed. Monitoring logic 320 may then perform optical character recognition or some other type of image recognition on the location/area of interest to identify the current value of the item of interest. Alternatively, monitoring logic 320 may send a request to the website of interest for information associated with the item of interest.

In each case, monitoring logic 320 may determine whether either the user-defined maximum or minimum target has been reached (act 740). For example, in this example, monitoring logic 320 may determine whether the Nasdaq stock index has reached 1800 (maximum target) or reached 1780 (minimum target).

If neither of the targets has been reached (act 740—no), monitoring logic 320 may continue to periodically monitor the Nasdaq website. If, however, one of the target values has been reached (act 740—yes), notification logic 330 may notify or alert the user (act 750).

Figure 8A:
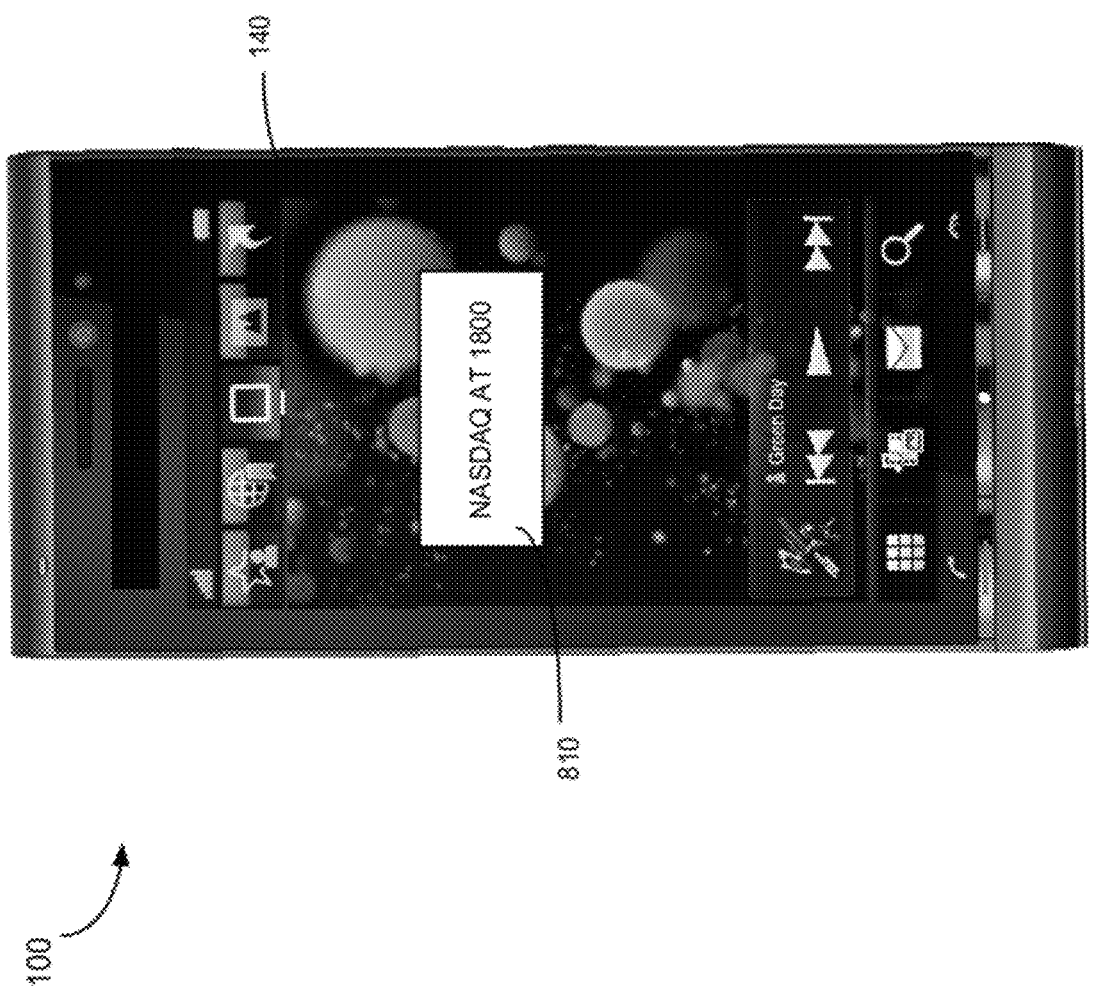
FIGS. 8A-8C are diagrams of exemplary displays associated with the processing described in FIG. 7.

For example, notification logic 330 may "pop" message 810 to display 140 indicating that the Nasdaq is at 1800, as illustrated in FIG. 8A. This message may be displayed regardless of what is currently being displayed on display 140. That is, message 810 may overlay any other information currently being provided on display 140. Alternatively, notification logic 330 may generate a text message, an SMS message, an email, a page or some other text message to be provided to the user of user device 100. In still other implementations, notification logic 330 may provide an audible alert, such as a beeping sound, a particular ringtone, etc., to output via, for example, speaker 120 (FIG. 1). In still other instances, notification logic 330 may output the web page that includes the item of interest to display 140.

Figure 8B:
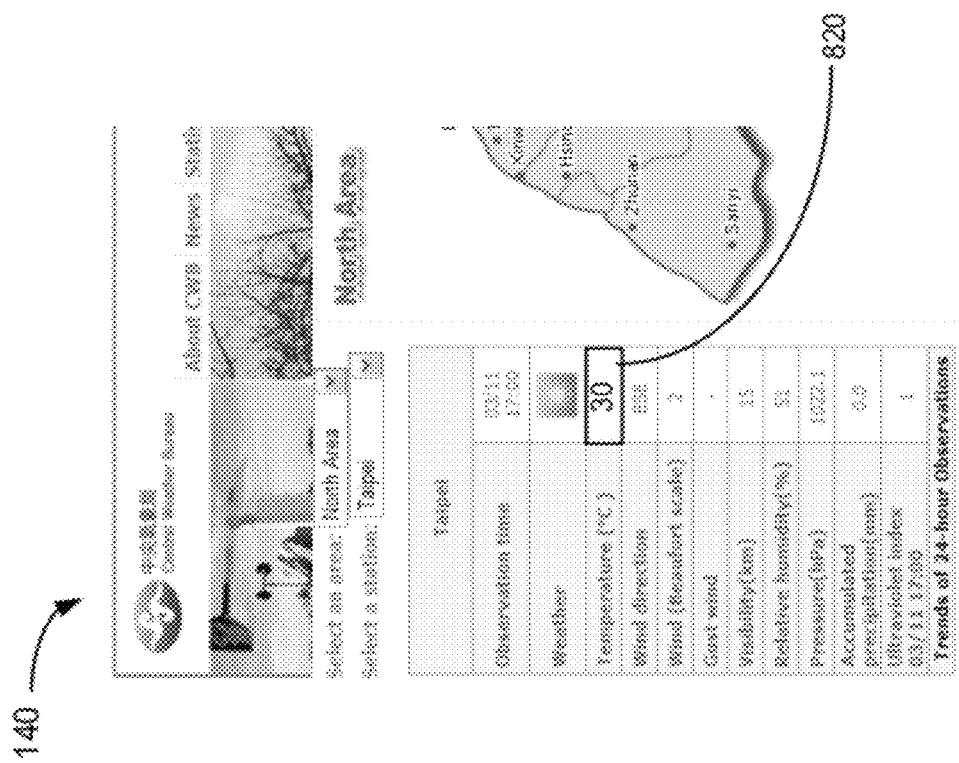

For example, returning to the example described above with respect to FIG. 4A, assume that the user has set a target value of 30° C. for the weather in Taipei. Further assume that the temperature has met the target value. In this case, notification logic 330 may download the web page of interest that shows the current temperature in Taipei is 30° C., as illustrated at area 820 in FIG. 8B. In some implementations, notification logic 330 may provide this web page on display 140 regardless of what is currently being displayed on display 140. In other implementations, notification logic 330 may flash this web page for a brief period of time (e.g., 10 seconds, one minute, etc.) and then return display 140 to the state it previously was in prior to the notification.

Figure 8C:
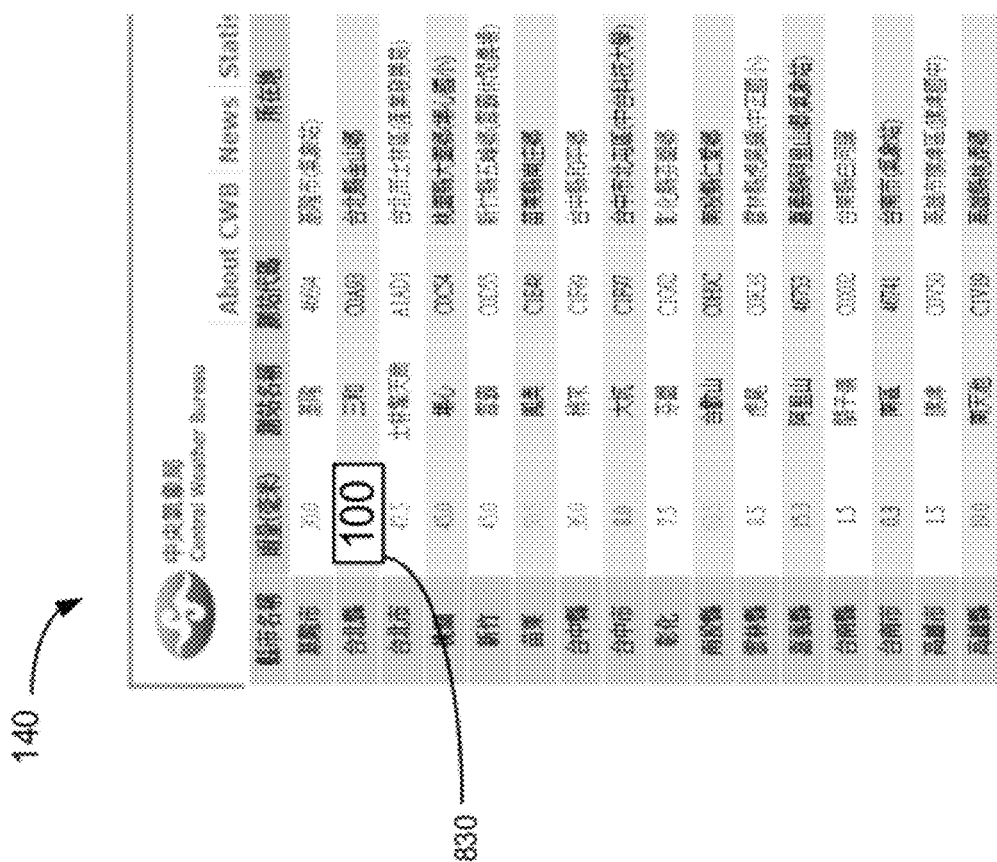

In some instances, notification logic 330 may provide the web page with the item of interest displayed in a more prominent format than other items on the web page. For example, returning to the example described above with respect to FIG. 4B in which the user has set a precipitation target value of 100 mm. Assume that precipitation in Taipei has reached 100 mm. In this case, notification logic 330 may download the web page of interest that shows the current precipitation and display the value in 100 in a larger font, as illustrated at area 830 in FIG. 8C. In other instances, the font associated with the precipitation value may be shown in a different color (e.g., red), in a bolder font, or made prominent in some other manner. In each case, notification logic 330 may generate an alert/notification for output via display 140, signal an output device on user device 100 (e.g., speaker 120, a vibrating mechanism, etc.) to provide an alert to the user, and/or signal an external device to provide an alert to a user associated with user device 100.

In this manner, the user may set parameters and receive updated information when one or more of the parameters reaches a user-defined target or threshold value. This may allow the user to keep abreast of certain conditions (e.g., weather conditions, business conditions, etc.), without having to continuously check on the parameters manually. For example, the user may set a threshold associated with a stock index, or a particular stock. When monitoring logic 320 detects that the target has been met, the user may be automatically notified. This may allow the user to take further action, such as buy or sell a stock, based on the target value. Similarly, when a weather condition meets a target value, the user may be notified so that the user may take further action, such as call home and alert his/her family of a particular condition, such as excessive rain that could cause flooding, excessive wind, etc.

CONCLUSION

Implementations described herein allow a user to set parameters associated with an item of interest and be automatically notified when a value associated with the item of interest reaches a target value. This may allow a user to more easily track a large number of items of interest without having to visit different sites on a periodic basis.

The foregoing description of the embodiments described herein provides illustration and description, but is not intended to be exhaustive or to limit the invention to the precise form disclosed. Modifications and variations are possible in light of the above teachings or may be acquired from the practice of the invention.

For example, aspects have been mainly described above with respect to setting parameters associated with financial information and weather information. It should be understood that processing described above may be applicable to any types of documents/information. As one example, a user may visit a merchant's website to find the price of a particular item (e.g., a jacket). The user may set a target value for the jacket and if the jacket is later reduced in price to the target value on the website, the user may be alerted.

In some implementations, the web page of interest may change configuration or layout while monitoring logic 320 is attempting to monitor the item of interest. In such cases, monitoring logic 320 may perform optical character recognition or some other type of image recognition to identify the item of interest. For example, in the example above with respect to FIG. 4A regarding the temperature in Taipei, monitoring logic 320 may perform optical character recognition or another type of image recognition to identify the word "temperature" on the web page of interest. Monitoring logic 320 may then use optical character recognition or other type of image recognition to identify the value located adjacent or near the word "temperature." In these implementations, target setting logic 310 may identify the term of interest, in addition to or instead of identifying a location of interest selected by the user, as described above with respect to FIG. 5.

In addition, in some implementations, the user may be set multiple target values for a single item of interest and also set different types of alerts when each target value is met. As an example, the user may set multiple target values associated with a stock. When the first target is reached, the user may be alerted in a first manner, such as a screen pop on display 140. When the stock value reaches a second target (e.g., a higher target), the user may be alerted in a different manner, such as an audible alert, vibratory alert, etc. In this case, the GUI provided by target setting logic 310 may allow the user to select the type of notification/alert when each target is met. In this manner, the user may assign an importance to the notification based on the type of notification that he/she receives.

Further, aspects have been described above as setting a target value on a document, such as a web page. In some instances, the user may select multiple items of interest on a single document and provide corresponding target values for each item on the document. Monitoring logic 320 may then monitor current values associated with the multiple items of interest on the single document (e.g., web page).

In addition, aspects have been described above with respect to providing a notification to a user. In some implementations, the notification may be sent to user device 100 and stored for later review, as opposed to sending an alert (e.g., screen pop, audible alarm, etc.) that is intended to immediately get the attention of the user. In such implementations, notification program 300 may provide an icon on display 140 indicating that notification data is provided for the user's review.

Still further, in some implementations, notification program 300 may automatically trigger functions other than providing a notification-related alert. For example, notification logic 330 may interface with another program to automatically perform an action in response to an item of interest meeting a threshold value. Continuing with the stock example, when the item of interest is a stock prices, notification logic 330 may automatically interface with an online broker to place a sell order when a target value is reached. In another case, when the item of interest is temperature, notification logic 330 may automatically signal a user's home heating or air conditioning system to turn on/shut down when a target temperature value is reached. In this manner, notification program 300 may automate additional functions and save the user significant time.

Still further, while series of acts have been described with respect to FIGS. 5 and 7, the order of the acts may be varied in other implementations consistent with the invention. Moreover, non-dependent acts may be performed in parallel.

It will also be apparent to one of ordinary skill in the art that aspects of the invention, as described above, may be implemented in computer devices, cellular communication devices/systems, media playing devices, methods, and/or computer program products. Accordingly, aspects of the present invention may be embodied in hardware and/or in software (including firmware, resident software, microcode, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an ASIC, an FPGA or other processing logic, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The scope of the invention is defined by the claims and their equivalents.

What is claimed is:

1. A method for informing a user of an electronic device about changes in weather data comprising:
    displaying a weather document on the device, wherein the weather document displays weather data for a geographic area;
    receiving, by the device, a first user input comprising an identification of a portion of the weather document displayed on the device, the identified portion of the weather document including a representation of a weather characteristic of the geographic area;
    generating, by the device, a first graphical user interface window that displays the identified portion of the weather document as a separate window from the weather document, wherein the representation of the weather characteristic is displayed as a user-selectable element of the first graphical user interface window;
    receiving, by the device, a second user input comprising a selection of the representation of the weather characteristic selected from the first graphical user interface window;
    generating, by the device and upon receiving the second user input, a second graphical user interface window that displays the value of the selected representation of the weather characteristic selected from the first graphical user interface window, wherein the second graphical user interface window comprises a user input interface for receiving a target weather characteristic;
    receiving, by the device, a target weather characteristic supplied by the user through the user input interface for receiving a target weather characteristic;
    periodically accessing, by the device, the identified portion of the weather document to monitor changes in the representation of the weather characteristic;
    determining, based on the monitored changes in the representation of the weather characteristic, that the representation of the weather characteristic has met or crossed the target weather characteristic; and
    notifying the user that the representation of the weather characteristic has met or crossed the target weather characteristic.

2. The method of claim 1 wherein the second user input includes a selection of a string of text characters from the first graphical user interface window that is the representation of a weather characteristic of the geographic area.

3. The method of claim 1 wherein the second user input includes a selected area of the first graphical user interface window and wherein the selected area includes the representation of the weather characteristic of the geographic area.

4. The method of claim 3 wherein the representation of the weather characteristic of the geographic area is a graphical representation of the weather characteristic.

5. The method of claim 4 further comprising determining the weather characteristic through image recognition.

6. The method of claim 5 wherein the graphical representation depicts text and wherein the image recognition is optical character recognition.

7. The method of claim 3 wherein the selection of the area of the user document is non-rectangular.

8. The method of claim 3 wherein the display is a touch display and wherein the selected area of the weather document is selected by the user drawing an enclosed boundary around the area with a finger of the user.

9. The method of claim 1 wherein the weather characteristic included in the identified portion of the weather document is an amount of precipitation.

10. The method of claim 1 wherein the weather characteristic included in the identified portion of the weather document is a temperature.

11. An electronic device comprising a display and a processor configured to:
    display a weather document on the display, wherein the weather document displays weather data for a geographic area;
    receive a first user input from a user comprising an identification of a portion of the weather document displayed on the device, the identified portion of the weather document including a representation of a weather characteristic of the geographic area;
    generate a first graphical user interface window that displays the identified portion of the weather document as a separate window from the weather document, wherein the representation of the weather characteristic is displayed as a user-selectable element of the first graphical user interface window;
receive a second user input comprising a selection of the representation of the weather characteristic selected from the first graphical user interface window;
generate, upon receiving the second user input, a second graphical user interface window that displays the value of the selected representation of the weather characteristic selected from the first graphical user interface window, wherein the second graphical user interface window comprises a user input interface for receiving a target weather characteristic;
receiving, by the device, a target weather characteristic supplied by the user through the user input interface for receiving a target weather characteristic;
periodically access the identified portion of the weather document to monitor changes in the representation of the weather characteristic;
determine, based on the monitored changes in the representation of the weather characteristic, that the representation of the weather characteristic has met or crossed the target weather characteristic; and
generate a notification, wherein the notification notifies the user that the representation of the weather characteristic has met or crossed the target weather characteristic.

12. The device of claim 11 wherein the second user input includes a selection of a string of text characters from the first graphical user interface window that is the representation of a weather characteristic of the geographic area.

13. The device of claim 11 wherein the second user input includes a selected area of the first graphical user interface window and wherein the selected area includes the representation of the weather characteristic of the geographic area.

14. The device of claim 13 wherein the representation of the weather characteristic of the geographic area is a graphical representation of the weather characteristic.

15. The device of claim 14 further configured to determine the weather characteristic through image recognition.

16. The device of claim 15 wherein the graphical representation depicts text and wherein the image recognition is optical character recognition.

17. The device of claim 13 wherein the selection of the area of the user document is non-rectangular.

18. The device of claim 13 wherein the display is a touch display and wherein the selected area of the weather document is selected by the user drawing an enclosed boundary around the area with a finger of the user.

19. The device of claim 11 wherein the weather characteristic included in the identified portion of the weather document is an amount of precipitation.

20. A method for informing a user of an electronic device about changes in data comprising:
displaying a document on the device, wherein the document displays numerical data;
receiving, by the device, a first user input comprising an identification of a portion of the document displayed on the device, the identified portion of the document including a representation of the numerical data;
generating, by the device, a first graphical user interface window that displays the identified portion of the document as a separate window from the document, wherein the representation of the numerical data is displayed as a user-selectable element of the first graphical user interface window;
receiving, by the device, a second user input comprising a selection of the representation of the numerical data selected from the first graphical user interface window;
generating, by the device and upon receiving the second user input, a second graphical user interface window that displays the value of the selected representation of the numerical data selected from the first graphical user interface window, wherein the second graphical user interface window comprises a user input interface for receiving a target value;
receiving, by the device, a target value supplied by the user through the user input interface for receiving a target value;
periodically accessing, by the device, the identified portion of the document to monitor changes in the representation of the numerical data;
determining, based on the monitored changes in the representation of the numerical data, that the representation of the numerical data has met or crossed the target value; and
notifying the user that the representation of the numerical value has met or crossed the target value.

* * * * *